Jan. 22, 1957 S. WEINSTEIN ET AL 2,778,517
OUTBOARD MOTOR LOADER FOR VEHICLE
Filed March 14, 1955 2 Sheets-Sheet 1

INVENTORS.
SEYMORE WEINSTEIN
JACK WALKER
BY Robert A. Sloman
ATTORNEY.

Jan. 22, 1957  S. WEINSTEIN ET AL  2,778,517
OUTBOARD MOTOR LOADER FOR VEHICLE
Filed March 14, 1955  2 Sheets-Sheet 2
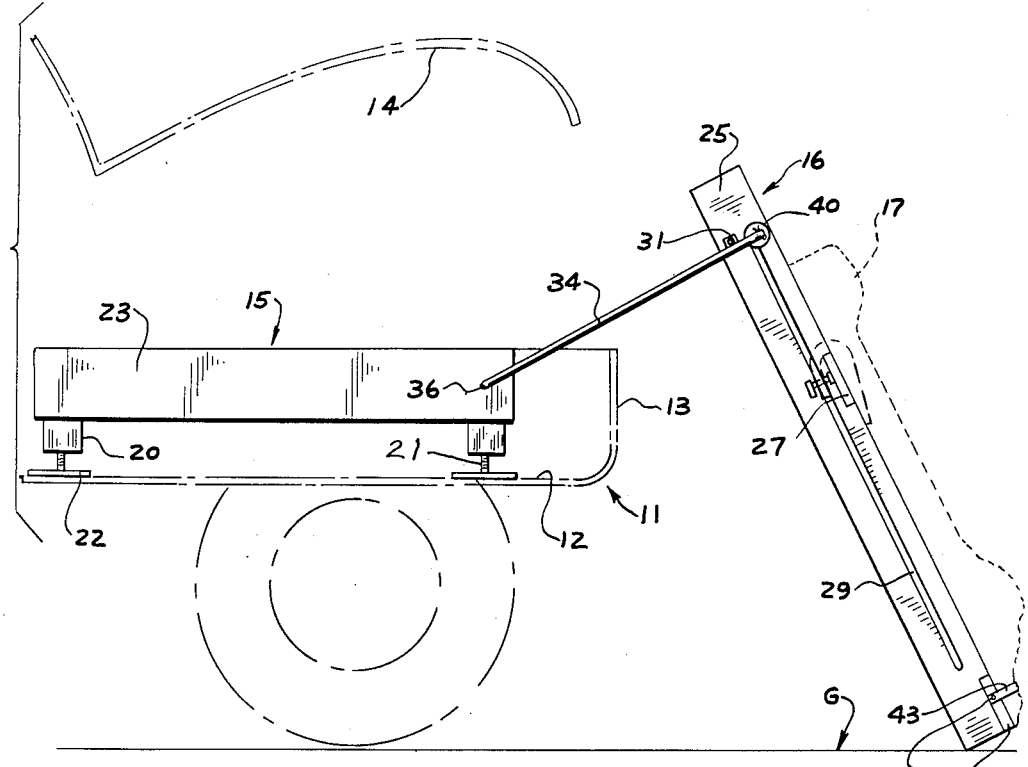
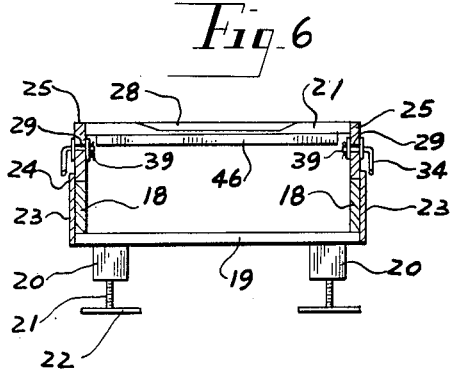
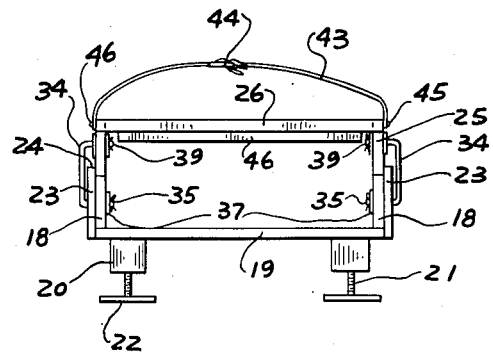
INVENTORS.
SEYMORE WEINSTEIN
JACK WALKER
BY
*Robert A. Sloman*
ATTORNEY.

United States Patent Office 2,778,517
Patented Jan. 22, 1957

2,778,517

OUTBOARD MOTOR LOADER FOR VEHICLE

Seymore Weinstein, Oak Park, and Jack Walker, Allen Park, Mich.

Application March 14, 1955, Serial No. 493,898

6 Claims. (Cl. 214—450)

This invention relates to an outboard motor loader for vehicles and more particularly to a motor loader adapted for positioning within the trunk compartment of an automobile.

Heretofore, great difficulty and effort has been experienced and exerted in attempting to place an outboard motor in a vehicle trunk or remove the same therefrom. There also existed the difficulty of having an effective mounting bracket by which the motor may be effectively transported in the vehicle without movement within the storage compartment.

It is the primary object of the present invention to provide a novel outboard motor loader which consists of a pair of frame structures adapted for positioning within the trunk compartment of a vehicle and so interconnected as to provide an effective support for an outboard motor.

It is the further object of the present invention to provide a control linkage between the said frames whereby the uppermost or motor mounting frame may be easily withdrawn rearwardly and upwardly so as to be lifted outwardly of the vehicle trunk and expeditiously tilted downwardly to engage the ground surface with the upper end of the motor mounting frame being pivotally interconnected with the first frame which remains within the storage compartment.

It is therefore the further object of the present invention to provide a simplified motor loading device whereby the motor may be mounted upon the device from the exterior of the vehicle and thereafter easily lifted and positioned with the vehicle trunk with a minimum of effort and with no danger of accident to the person lifting the motor.

Figure 1:
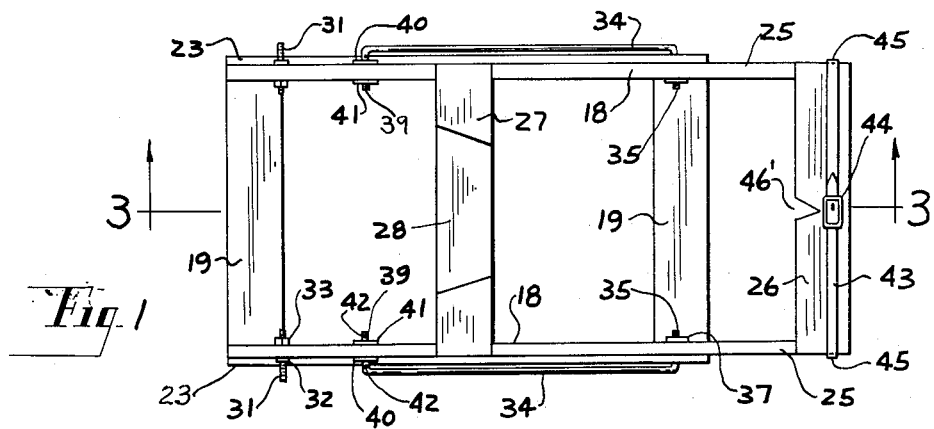
Figure 2:
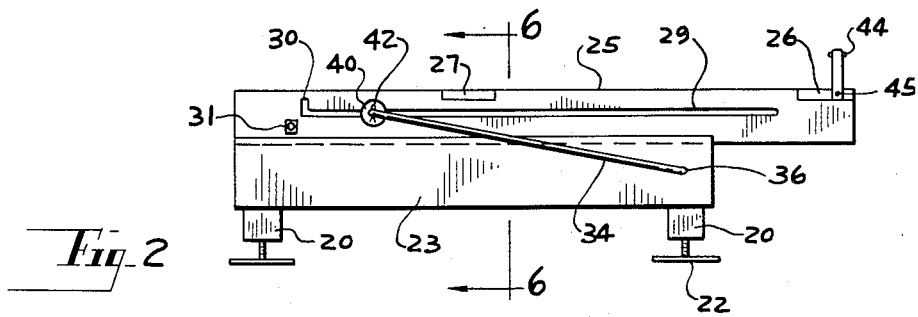
Figure 3:
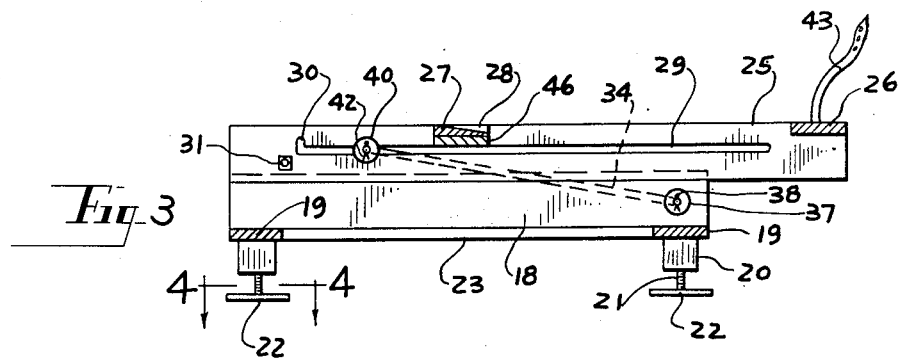
Figure 4:
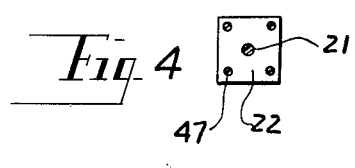

These and other objects will be seen from the following specification and claims in conjunction with the appended drawings in which:

Fig. 1 is a plan view of the present motor loader.
Fig. 2 is a side elevational view thereof.
Fig. 3 is a section taken on line 3—3 of Fig. 1.
Fig. 4 is a section taken on line 4—4 of Fig. 3.
Fig. 5 is a schematic fragmentary illustration of the trunk compartment of a vehicle with the trunk compartment cover elevated and also illustrating in side elevation the positioning of the two frame elements of the motor loader in loading position.
Fig. 6 is a section taken on line 6—6 of Fig. 2; and
Fig. 7 is an end elevational view of the motor loader shown in Fig. 2.

It will be understood that the above drawings illustrate merely a preferred embodiment of the invention and that other embodiments are contemplated within the scope of the claims hereafter set forth.

Referring to the drawings, in Fig. 5, there is schematically shown a portion of a vehicle, namely, the trunk compartment generally indicated at 11 and which includes the bottom floor 12 and the upright rear wall 13, the trunk compartment cover 14 being fragmentarily illustrated in open position.

The present motor loader generally designated at 15—16 includes a first frame 15 normally maintained within the storage compartment 11 and a second frame element 16 normally mounted upon frame 15 and adapted to carry an outboard motor or other object such as designated in phantom at 17.

In Fig. 5 the second frame 16 is shown in a loading position upon the exterior of the storage compartment and with its forward end resting upon the ground surface as designated at G.

Referring more specifically to the other illustrations in the drawings, frame 15 includes a pair of parallel spaced horizontally extending rails 18 which are interconnected at their opposite ends and at their under surfaces by the cross support plates 19.

At the opposite ends of each cross support there is provided a depending stub leg 20 which has depending from its lower end and axially thereof the headed screws 22 which include threaded shanks 21 to permit vertical adjustment thereof with respect to said legs to thereby level if necessary frame 15 with respect to the floor 12 of the storage compartment. The heads 22 thereby serve as supporting feet for mounting frame 15 in the manner shown in Fig. 5, and are secured to floor 12 by screws 47, Fig. 4.

Mounted and secured upon the outsides of rails 18 are a pair of upright longitudinally extending guide plates 23 which along their lower longitudinal edges extend below rails 18 in registry with the opposite ends of cross supports 19.

The upper longitudinal edges of plates 23 extend above the top edges of rails 18 as at 24 thereby defining a pair of retaining guides for cooperatively receiving the respective parallel spaced longitudinally extending upright side walls 25 of the second frame 16.

This second frame includes a pair of such side walls which are slidably positioned in vertical registry with rails 18 as shown in Fig. 6, as well as Fig. 2. Walls 25 are interconnected at their forward ends by the cross support 26 which is secured to the top surfaces thereof. Said walls are also interconnected intermediate their ends and toward their rear ends as by the second cross support 27 whose respective ends are nested within corresponding notches formed in the top surfaces of said side walls. Support 27 is adapted to be gripped by the motor clamp.

A centering and downwardly tapered notch 28 is formed in cross support 27 to facilitate positioning and clamping of the motor upon and centrally of frame 16. Cross support 27 is reinforced by the underlying elongated cross support 46 which is secured thereunder.

A pair of longitudinally extending transverse slots 29 are formed through side walls 25 and extend throughout a substantial portion of the length thereof, said slots terminating at their rear ends in the upright notches 30.

A pair of transversely arranged aligned stop pins 31 with shoulders 32 extend through portions of side walls 25 adjacent the notched ends of slots 29 and arranged slightly therebelow for cooperative engagement with the links 34 in the manner hereafter described, and as shown in Fig. 5. The shoulders on pins 31 engage one side of the walls 25, the opposite sides of said walls being retainingly engaged by the nuts 33 which are threaded onto pins 31 for immovably securing the same in position.

A pair of elongated opposed links in the form of rods 34 are positioned upon the opposite sides of frames 15 and 16 with the respective opposite ends of said links as at 35 and 39 inturned normally of the body of said links and arranged in lateral alignment as shown in Figs. 1 and 6.

The lower ends 35 of said links project through transverse apertures 36 formed in the forward ends of rails 18 and plates 23 and are secured pivotally with respect to said rails by the washers 37 and the cotter pins 38 as shown in Fig. 3.

The upper opposed inturned end portions 39 of said links loosely and slidably extend through the opposed slots 29 and are secured with respect to said slots in sliding relation by means of a pair of washers 40 and 41 arranged upon opposite sides of the side walls 25 and secured as by the cotter pins 42.

Thus the upper free ends of links 34 are guidably and slidably received within the slots 29 in the said second frame as generally indicated at 16.

Transversely of the forward end of frame 16 and extending over cross plate 26, there is provided a clamping strap 43 with a suitable buckle for illustration 44, and with the opposite ends of the strap secured to opposite ends of the cross support 26 as by the fasteners 45.

In operation, initially the frame 16 is separated from frame 15 in the manner shown in Fig. 5 by manually grasping the front portion of frame 16 with both hands. Thereafter the said frame is withdrawn or slid rearwardly, and in view of the connection of the links 34, said frame as supported at its rear end will move upwardly with respect to frame 15 as it is withdrawn. The forward end of frame 16 is placed upon the ground manually in the relative angular position shown in Fig. 5.

Thereafter the outboard motor 17 or other object is centrally mounted upon frame 16 and strapped thereto as by the strap 43. Thereafter the user grasps the forward portion of frame 16 adjacent where it rests upon the ground and pivotally lifts the said frame to a substantially horizontal position, at the same time moving the said frame rearwardly about its pivotal mounting, i. e., the lower inturned ends 35 of links 34, until frame 16 in a horizontal position registers with and is supported upon the top edges of rails 18, then it is slid forwardly on said rails to the position of Fig. 2.

In this position the outboard motor 17 or other object is effectively secured and mounted conveniently within the trunk compartment 11.

At the desired location the motor is removed from the trunk with a minimum of effort and with no danger by merely reversing the process.

In slidably withdrawing frame 16 the inturned ends 39 at the upper end of links 34 will slide longitudinally along and within slots 29 and eventually will nest within the upright notches 30. Upon further rearward withdrawing movement, the frame 16 will be automatically elevated as the links 34 rotate about their pivot points 35 in a clockwise direction.

The notch 46' which is formed in the cross support 26 forming a part of frame 16 serves as a centering notch and is adapted to receive the end portion of the motor 17 to facilitate mounting thereof upon said frame.

Having described our invention, reference should now be had to the claims which follow for determining the scope thereof.

We claim:

1. An outboard motor loader comprising a stationary first frame adapted for positioning within the trunk compartment of a vehicle, a motor mounting second frame normally supported on said first frame in juxtaposition, said second frame including a pair of elongated upright walls having opposed longitudinal transverse slots therethrough, and a pair of elongated opposed links with their respective opposite ends inturned and in alignment, the opposed upper ends of said links extending loosely through said slots and longitudinally movable therein, the opposed lower ends of said links extending pivotally through corresponding apertures formed in said first frame adjacent its rear end whereby the second frame may be manually withdrawn rearwardly and upwardly from said first frame pivotally supported at its front end by said links, the rearward free end of said second frame adapted to rest upon the ground surface.

2. The motor loader of claim 1, said first frame including a pair of spaced longitudinally extending upright side rails, cross support plates secured at opposite ends of said rails thereunder, stub legs depending from the ends of the cross supports, and inverted headed leveling screws depending from said legs to engage a supporting surface.

3. The motor loader of claim 1, said first frame including a pair of spaced longitudinally extending upright side rails, upright guide plates secured to the outer surfaces of said rails and extending above their top edges, the walls of said second frame slidably supported on said rails and retained by said guide plates.

4. The motor loader of claim 1, and means mounted and secured upon the respective inturned ends of said links retainingly cooperable with said frames.

5. The motor loader of claim 1, a pair of spaced washers secured upon the upper ends of each link upon opposite sides of said walls slidably overlapping said slots, and washers secured upon the lower ends of said links and bearing against the interior surfaces of said rails.

6. The motor loader of claim 1, the forward ends of said slots terminating in upright notches, adapted to retainingly receive the upper ends of said links, and opposed transversely arranged stop pins projecting laterally outward from said walls adjacent and below the ends of said slots corresponding to said notches, said pins retainingly engaging said links adjacent their upper ends when said second frame is rearwardly lifted.

References Cited in the file of this patent

UNITED STATES PATENTS

| | | |
|---|---|---|
| 2,094,401 | Girl | Sept. 28, 1937 |
| 2,318,971 | Roumage et al. | May 11, 1943 |
| 2,464,071 | Coffing | Mar. 8, 1949 |
| 2,549,018 | Sarlo | Apr. 17, 1951 |
| 2,663,474 | Kelly | Dec. 22, 1953 |